United States Patent
Sakiyama et al.

(10) Patent No.: US 11,904,573 B2
(45) Date of Patent: Feb. 20, 2024

(54) HOT-STAMP-MOLDED ARTICLE

(71) Applicant: NIPPON STEEL CORPORATION, Tokyo (JP)

(72) Inventors: Yuji Sakiyama, Tokyo (JP); Yuri Toda, Tokyo (JP); Kazuo Hikida, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 103 days.

(21) Appl. No.: 17/614,400

(22) PCT Filed: May 28, 2020

(86) PCT No.: PCT/JP2020/021138
§ 371 (c)(1),
(2) Date: Nov. 26, 2021

(87) PCT Pub. No.: WO2020/241763
PCT Pub. Date: Dec. 3, 2020

(65) Prior Publication Data
US 2022/0234330 A1    Jul. 28, 2022

(30) Foreign Application Priority Data

May 31, 2019 (JP) ................................ 2019-101987

(51) Int. Cl.
| | |
|---|---|
| *C22C 38/00* | (2006.01) |
| *C22C 38/02* | (2006.01) |
| *C22C 38/04* | (2006.01) |
| *C22C 38/06* | (2006.01) |
| *B32B 15/01* | (2006.01) |
| *C21D 6/00* | (2006.01) |
| *C21D 8/02* | (2006.01) |
| *C21D 9/46* | (2006.01) |
| *C22C 18/00* | (2006.01) |
| *C22C 38/12* | (2006.01) |
| *C22C 38/14* | (2006.01) |
| *C22C 38/18* | (2006.01) |

(52) U.S. Cl.
CPC ............ *B32B 15/013* (2013.01); *C21D 6/002* (2013.01); *C21D 6/005* (2013.01); *C21D 6/008* (2013.01); *C21D 8/0205* (2013.01); *C21D 9/46* (2013.01); *C22C 18/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C21D 2211/008* (2013.01)

(58) Field of Classification Search
CPC ....... C22C 38/002; C22C 38/04; C22C 38/06; C22C 38/02
USPC ....................................................... 428/659
See application file for complete search history.

(56) References Cited

U.S. PATENT DOCUMENTS

| | | |
|---|---|---|
| 2012/0321903 A1 | 12/2012 | Nakamaru et al. |
| 2013/0252017 A1 | 9/2013 | Nakajima et al. |
| 2015/0027596 A1 | 1/2015 | Miyoshi et al. |
| 2017/0081741 A1* | 3/2017 | Tabata ................ C22C 38/48 |
| 2017/0306437 A1* | 10/2017 | Nakagawa ............ C22C 38/08 |
| 2018/0023162 A1 | 1/2018 | Sugiura et al. |
| 2018/0305786 A1 | 10/2018 | Nakagawa et al. |

FOREIGN PATENT DOCUMENTS

| | | |
|---|---|---|
| CN | 103221581 A | 7/2013 |
| CN | 108138290 A | 6/2018 |
| JP | 2012-172203 A | 9/2012 |
| JP | 5861766 B2 | 2/2016 |
| KR | 10-2012-0049955 A | 5/2012 |
| WO | WO 2016/132545 A1 | 8/2016 |

OTHER PUBLICATIONS

Ungár et al., "The contrast factors of dislocations in cubic crystals: the dislocation model of strain anisotropy in practice", Journal of Applied Crystallography, 1999, vol. 32, pp. 992-1002.

* cited by examiner

*Primary Examiner* — Katherine A Christy

(74) *Attorney, Agent, or Firm* — Birch, Stewart, Kolasch & Birch, LLP

(57) ABSTRACT

A hot-stamped article according to the present invention has a plating layer being attached to a single surface in an amount of 10 g/m² or more and 90 g/m² or less and having a Ni content of 10 mass % or more and 25 mass % or less with a remainder including Zn and impurities on a surface of a base steel sheet having a predetermined chemical composition, in a surface layer region, a metallographic structure includes 80.0% or more of martensite and 8.0% or more of residual austenite in terms of area percentage, and the concentration of Ni in the surface layer region is 8 mass % or more.

2 Claims, No Drawings

HOT-STAMP-MOLDED ARTICLE

TECHNICAL FIELD

The present invention relates to a hot-stamped article. Priority is claimed on Japanese Patent Application No. 2019-101987, filed May 31, 2019, the content of which is incorporated herein by reference.

BACKGROUND ART

In recent years, there has been a demand for the weight reduction of automotive bodies from the viewpoint of environmental protection and resource saving, and the application of high-strength steel sheets to automotive parts has been accelerating. Automotive parts are manufactured by press forming, and an increase in the strength of steel sheets does not only increase forming loads but also degrades formability, which creates a problem with the formability of high-strength steel sheets into parts with a complicated shape. In order to solve such a problem, the application of hot stamping techniques, in which a steel sheet is heated to a high temperature in an austenite region where the steel sheet softens and then formed by pressing, is underway. Hot stamping is drawing attention as a technique in which a quenching treatment is carried out in a die at the same time as pressing, thereby satisfying both formability into automotive parts and the securement of the strength of automotive parts.

However, in hot-stamped articles of the related art manufactured by hot stamping, a hard structure (mainly martensite) is formed throughout the entire region in the sheet thickness direction, and thus the deformability is poor. In order to obtain superior collision properties in automotive parts, there is a need to enhance the impact energy absorption capability. When deformation modes at the time of collision are taken into account, there is a need to enhance deformability, particularly, bendability.

Patent Document 1 discloses a technique in which the cooling rate from finishing rolling through coiling in a hot rolling process is controlled to control the crystal orientation difference in bainite to become 5° to 14°, thereby improving deformability such as stretch-flangeability.

Patent Document 2 discloses a technique in which manufacturing conditions for finishing rolling through coiling in a hot rolling process are controlled to control the strength of a specific crystal orientation group out of ferrite crystal grains, thereby improving local deformability.

Patent Document 3 discloses a technique in which a heat treatment is carried out on a steel sheet for hot stamping to form ferrite in the surface layer, thereby reducing the number of pores that are generated in the interface between ZnO and the steel sheet or the interface between ZnO and a Zn-based plating layer during heating before hot pressing and improving perforation corrosion resistance or the like.

However, in the above-described techniques, there are cases where a sufficient strength and sufficient bendability cannot be obtained.

CITATION LIST

Patent Document

[Patent Document 1]
PCT International Publication No. WO 2016/132545

[Patent Document 2]
Japanese Unexamined Patent Application, First Publication No. 2012-172203

[Patent Document 3]
Japanese Patent No. 5861766

Non-Patent Documents

[Non-Patent Document 1]
T. Ungar and three coauthors, Journal of Applied Crystallography (1999), Volume 32 (pp. 992 to 1002)

SUMMARY OF THE INVENTION

Problems to be Solved by the Invention

The present invention has been made in consideration of the problem of the related art, and an objective of the present invention is to provide a hot-stamped article having excellent strength and excellent bendability.

Means for Solving the Problem

The present inventors carried out intensive studies regarding a method for solving the above-described problem and consequently obtained the following findings.

The present inventors carried out studies regarding the bendability of hot-stamped articles. As a result, the present inventors found that, when the metallographic structure of a surface layer region, which is a region from a surface to a depth of 50 μm, of a base steel sheet that configures a hot-stamped article includes 80.0% or more of martensite and 8.0% or more of residual austenite in terms of area percentage and the concentration of Ni in the surface layer region is 8 mass % or more, the bendability of the hot-stamped article improves.

Furthermore, the present inventors found that, in order to obtain the above-described metallographic structure in the surface layer region of the base steel sheet that configures the hot-stamped article, in the surface layer region in the steel sheet for hot stamping before hot stamping, it is necessary to set the average dislocation density to $4 \times 10^{15}$ m/m$^3$ or more, to set the proportion of the crystal grains of one or more kinds of unauto-tempered martensite and lower bainite to 15.0% or more in terms of area percentage, and to carry out hot stamping under a predetermined condition.

The present invention has been made by further progressing studies based on the above-described findings, and the gist thereof is as described below.

[1] A hot-stamped article according to one aspect of the present invention having a base steel sheet containing, as chemical components, by mass %,
C: 0.15% or more and less than 0.70%,
Si: 0.005% or more and 0.250% or less,
Mn: 0.30% or more and 3.00% or less,
sol. Al: 0.0002% or more and 0.500% or less,
P: 0.100% or less,
S: 0.1000% or less,
N: 0.0100% or less,
Nb: 0% or more and 0.150% or less,
Ti: 0% or more and 0.150% or less,
Mo: 0% or more and 1.000% or less,
Cr: 0% or more and 1.000% or less,
B: 0% or more and 0.0100% or less,
Ca: 0% or more and 0.0100% or less, and REM: 0% or more and 0.30% or less with a remainder including Fe and impurities and a plating layer on a surface of the base steel sheet, the plating layer being attached to a single surface in an amount of 10 g/m² or more and 90 g/m² or less and having a Ni content of 10 mass % or more and 25 mass % or less with a remainder including Zn and impurities, in which a metallographic structure of a surface layer region that is a region from the surface of the base steel sheet to a depth of 50 μm includes 80.0% or more of martensite and 8.0% or more of residual austenite in terms of area percentage, and the concentration of Ni in the surface layer region is 8 mass % or more.

[2] The hot-stamped article according to [1] may further contain, in the base steel sheet, as chemical components, by mass %, one or more selected from the group consisting of Nb: 0.010% or more and 0.150% or less,
Ti: 0.010% or more and 0.150% or less,
Mo: 0.005% or more and 1.000% or less,
Cr: 0.005% or more and 1.000% or less,
B: 0.0005% or more and 0.0100% or less,
Ca: 0.0005% or more and 0.0100% or less, and
REM: 0.0005% or more and 0.30% or less.

Effects of the Invention

According to the above-described aspect of the present invention, it is possible to provide a hot-stamped article having excellent strength and excellent bendability.

Embodiment for Implementing the Invention

In a hot-stamped article according to the present embodiment, the metallographic structure of a surface of a base steel sheet that configures the hot-stamped article, in other words, a surface layer region that is a region from the surface of the base steel sheet after hot stamping to a depth of 50 μm includes 80.0% or more of martensite and 8.0% or more of residual austenite in terms of area percentage, and the concentration of Ni in the surface layer region is 8 mass % or more. Such characteristics make it possible to obtain a hot-stamped article having excellent strength and excellent bendability. In the present embodiment, the expression "having excellent strength" refers to the fact that the (maximum) tensile strength is 1500 MPa or higher.

As a result of intensive studies, the present inventors found that a hot-stamped article having the above-described metallographic structure can be obtained by the following method.

As a first stage, in a hot rolling process, cooling is initiated within five seconds from the end of finishing rolling in a manner that the average cooling rate on the surface of the base steel sheet reaches 80° C./s or faster, and the base steel sheet is cooled to a temperature region of lower than 500° C. and coiled. Even after coiled, the base steel sheet is continuously cooled with water to room temperature (approximately 40° C. or lower). As described above, compared with the related art, the average cooling rate is set to be fast and the coiling temperature is set to be low, whereby it is possible to suppress the generation of a carbide, ferritic transformation, and bainitic transformation. This makes it possible in the metallographic structure of the surface layer region in the steel sheet for hot stamping to set the proportion of the crystal grains of one or two kinds of unauto-tempered martensite and lower bainite to 15.0% or more in terms of area percentage and to set the average dislocation density of the surface layer region to $4\times10^{15}$ m/m³ or more.

As a second stage, a Zn-based plating layer containing 10 to 25 mass % of Ni is formed on the surface of the base steel sheet such that the amount attached to the single surface reaches 10 to 90 g/m², thereby producing a steel sheet for hot stamping.

As a third stage, the average heating rate of heating before hot stamping is controlled, thereby diffusing Ni in the plating layer disposed on the surface of the base steel sheet into the surface layer region of the base steel sheet.

Usually, in hot-rolled steel sheets having a high dislocation density that contain 0.15 mass % or more of C, have a metallographic structure including martensite, and are not tempered, ductility, toughness, and hydrogen embrittlement resistance deteriorate. Additionally, in the case of carrying out cold rolling after coiling, since the above-described hot-rolled steel sheets do not have excellent ductility, cracking is likely to occur. Therefore, it is usual that the above-described hot-rolled steel sheets are tempered after hot rolling and before post processes. In order to improve the bendability and hydrogen embrittlement resistance of hot-rolled steel sheets, it is important to improve the ductility of the surface layer region, and thus there are also cases where a treatment for softening the surface layer region (for example, a surface layer decarburization treatment) is carried out on the above-described steel sheets.

In addition, usually, when steel sheets containing 0.15 mass % or more of C are hot-stamped, there are cases where the hot-stamped articles are not excellent in terms of bendability.

However, in the present embodiment, the metallographic structure of the surface layer region in the steel sheet for hot stamping is put into a preferred state, and Ni in the plating layer disposed on the surface of the base steel sheet is diffused into the surface layer region of the base steel sheet by heating before hot stamping, whereby it is possible to improve the bendability or hydrogen embrittlement resistance of the hot-stamped article even without tempering after hot stamping.

The metallographic structure of the surface layer region in the steel sheet for hot stamping that is applied to the hot-stamped article according to the present embodiment includes 15.0% or more of the crystal grains of one or two kinds of unauto-tempered martensite and lower bainite in terms of area percentage. Inside the crystal grains of unauto-tempered martensite and lower bainite, the dislocation density is high, and these crystal grains have a small crystal grain size. Therefore, in the steel sheet for hot stamping according to the present embodiment, heating before hot stamping makes it easy for Ni contained in the plating layer to diffuse into the surface layer region through crystal grain boundaries and dislocations in the surface layer region of the base steel sheet as passages. Since Ni is an austenite-stabilizing element, when Ni in the plating layer diffuses into the surface layer region of the base steel sheet to increase the concentration of Ni in the surface layer region of the base steel sheet, residual austenite is likely to remain in the surface layer region of the base steel sheet that configures the hot-stamped article. The bendability of the hot-stamped article can be improved by causing a predetermined amount of residual austenite to remain in the surface layer region of the base steel sheet that configures the hot-stamped article using not only C but also Ni. The present inventors found that, in order to diffuse Ni into the surface layer region of the base steel sheet to cause a predetermined amount of residual austenite to remain in the surface layer region of the base steel sheet that configures the hot-stamped article, there is a need to set the average heating rate of heating before hot stamping to slower than 100° C./s. When the average heating rate of heating before hot stamping is set to slower than 100° C./s, Ni diffuses through not only crystal grain boundaries but also dislocations in the surface layer region of the base steel sheet as passages, which makes it possible to uniformly diffuse Ni into the surface layer region.

Hereinafter, the hot-stamped article according to the present embodiment and a method for manufacturing the same will be described in detail. First, reasons for limiting the chemical composition of the steel sheet that configures the hot-stamped article according to the present embodiment will be described.

Numerical limitation ranges to be described below include the lower limit value and the upper limit value in the range. Numerical values with an expression of "less than" or "more than" do not include the numerical value in the numerical range. Regarding the chemical composition, "%" indicates "mass %" in all cases.

The base steel sheet that configures the hot-stamped article according to the present embodiment contains, as chemical components, by mass %, C: 0.15% or more and less than 0.70%, Si: 0.005% or more and 0.250% or less, Mn: 0.30% or more and 3.00% or less, sol. Al: 0.0002% or more and 0.500% or less, P: 0.100% or less, S: 0.1000% or less, N: 0.0100% or less with a remainder including Fe and impurities.

"C: 0.15% or More and Less than 0.70%"

C is an important element for obtaining a tensile strength of 1500 MPa or higher in the hot-stamped article. When the C content is less than 0.15%, martensite becomes soft, and it is difficult to obtain a tensile strength of 1500 MPa or higher. In addition, when the C content is less than 0.15%, the area rate of unauto-tempered martensite and lower bainite decreases. Therefore, the C content is set to 0.15% or more. The C content is preferably 0.20% or more and more preferably 0.30% or more. On the other hand, when the C content is 0.70% or more, a coarse carbide is generated, breakage is likely to occur, and the bendability and hydrogen embrittlement resistance of the hot-stamped article deteriorate. Therefore, the C content is set to less than 0.70%. The C content is preferably 0.50% or less and more preferably 0.45% or less.

"Si: 0.005% or More and 0.250% or Less"

Si is an element that is contained to secure hardenability. When the Si content is less than 0.005%, the above-described effect cannot be obtained, and, in the steel sheet for hot stamping, there are cases where the dislocation density decreases and cases where unauto-tempered martensite and lower bainite cannot be obtained, which makes it impossible to obtain a desired metallographic structure in the hot-stamped article. Therefore, the Si content is set to 0.005% or more. Even when more than 0.250% of Si is contained, the above-described effect is saturated, and thus the Si content is set to 0.250% or less. The Si content is preferably 0.210% or less.

"Mn: 0.30% or More and 3.00% or Less"

Mn is an element that contributes to improvement in the strength of the hot-stamped article by solid solution strengthening. When the Mn content is less than 0.30%, the solid solution strengthening capability is poor, martensite becomes soft, and it is difficult to obtain a tensile strength of 1500 MPa or higher in the hot-stamped article. Therefore, the Mn content is set to 0.30% or more. The Mn content is preferably 0.50% or more or 0.70% or more. On the other hand, when the Mn content is set to more than 3.00%, a coarse inclusion is generated in steel, breakage is likely to occur, and the bendability and hydrogen embrittlement resistance of the hot-stamped article deteriorate. Therefore, the upper limit is set to 3.00%. The Mn content is preferably 2.50% or less or 2.00% or less.

"Sol. Al (Acid-Soluble Al): 0.0002% or More and 0.500% or Less"

Al is an element having an action of deoxidizing molten steel to make the steel sound (suppressing the generation of a defect such as a blowhole in steel). When the sol. Al content is less than 0.0002%, since molten steel is not sufficiently deoxidized, and the above-described effect cannot be obtained, the sol. Al content is set to 0.0002% or more. The sol. Al content is preferably 0.0010% or more or 0.0020% or more. On the other hand, when the sol. Al content exceeds 0.500%, a coarse oxide is generated in steel, and the bendability and hydrogen embrittlement resistance of the hot-stamped article deteriorate. Therefore, the sol. Al content is set to 0.500% or less. The sol. Al content is preferably 0.400% or less or 0.300% or less.

"P: 0.100% or Less"

P is an element that is segregated in grain boundaries and degrades the strength of the grain boundaries. When the P content exceeds 0.100%, the strength of grain boundaries significantly decreases, and the bendability and hydrogen embrittlement resistance of the hot-stamped article deteriorate. Therefore, the P content is set to 0.100% or less. The P content is preferably 0.050% or less. The lower limit of the P content is not particularly limited. However, when the P content is decreased to lower than 0.0001%, the dephosphorization cost increases significantly, which is not preferable economically, and thus the lower limit of the P content may be set to 0.0001% in actual operation.

"S: 0.1000% or Less"

S is an element that forms an inclusion in steel. When the S content exceeds 0.1000%, a large amount of an inclusion is generated in steel, and the bendability and hydrogen embrittlement resistance of the hot-stamped article deteriorate. Therefore, the S content is set to 0.1000% or less. The S content is preferably 0.0050% or less. The lower limit of the S content is not particularly limited. However, when the S content is decreased to lower than 0.00015%, the desulfurization cost increases significantly, which is not preferable economically, and thus the lower limit of the S content may be set to 0.00015% in actual operation.

"N: 0.0100% or Less"

N is an impurity and an element that forms a nitride in steel to degrade the toughness and hydrogen embrittlement resistance of the hot-stamped article. When the N content exceeds 0.0100%, a coarse nitride is generated in steel to significantly degrade the bendability and hydrogen embrittlement resistance of the hot-stamped article. Therefore, the N content is set to 0.0100% or less. The N content is preferably 0.0075% or less. The lower limit of the N content is not particularly limited. However, when the N content is decreased to lower than 0.0001%, the denitrification cost increases significantly, which is not preferable economically, and thus the lower limit of the N content may be set to 0.0001% in actual operation.

The remainder of the chemical composition of the base steel sheet that configures the hot-stamped article according to the present embodiment is Fe and impurities. As the impurity, exemplified is an element that is inevitably contained by accident from a steel raw material or a scrap and/or in a steel making process and is permitted to an extent that the properties of the hot-stamped article according to the present embodiment are not impaired.

The Ni content of the base steel sheet that configures the hot-stamped article according to the present embodiment is less than 0.005%. Since Ni is an expensive element, in the present embodiment, it is possible to suppress the cost at a low level compared with a case where the Ni content is set to 0.005% or more by intentionally including Ni.

The base steel sheet that configures the hot-stamped article according to the present embodiment may contain the following elements as arbitrary elements. In a case where the following arbitrary elements are not contained, the amount thereof is 0%.

"Nb: 0% or More and 0.150% or Less"

Nb is an element that contributes to improvement in the strength of the hot-stamped article by solid solution strengthening and thus may be contained as necessary. In a case where Nb is contained, the Nb content is preferably set to 0.010% or more in order to reliably exhibit the above-described effect. The Nb content is more preferably 0.035% or more. On the other hand, even when more than 0.150% of Nb is contained, the above-described effect is saturated, and thus the Nb content is preferably set to 0.150% or less. The Nb content is more preferably 0.120% or less.

"Ti: 0% or More and 0.150% or Less"

Ti is an element that contributes to improvement in the strength of the hot-stamped article by solid solution strengthening and thus may be contained as necessary. In a case where Ti is contained, the Ti content is preferably set to 0.010% or more in order to reliably exhibit the above-described effect. The Ti content is preferably 0.020% or more. On the other hand, even when more than 0.150% of Ti is contained, the above-described effect is saturated, and thus the Ti content is preferably set to 0.150% or less. The Ti content is more preferably 0.120% or less.

"Mo: 0% or More and 1.000% or Less"

Mo is an element that contributes to improvement in the strength of the hot-stamped article by solid solution strengthening and thus may be contained as necessary. In a case where Mo is contained, the Mo content is preferably set to 0.005% or more in order to reliably exhibit the above-described effect. The Mo content is more preferably 0.010% or more. On the other hand, even when more than 1.000% of Mo is contained, the above-described effect is saturated, and thus the Mo content is preferably set to 1.000% or less. The Mo content is more preferably 0.800% or less.

"Cr: 0% or More and 1.000% or Less"

Cr is an element that contributes to improvement in the strength of the hot-stamped article by solid solution strengthening and thus may be contained as necessary. In a case where Cr is contained, the Cr content is preferably set to 0.005% or more in order to reliably exhibit the above-described effect. The Cr content is more preferably 0.100% or more. On the other hand, even when more than 1.000% of Cr is contained, the above-described effect is saturated, and thus the Cr content is preferably set to 1.000% or less. The Cr content is more preferably 0.800% or less.

"B: 0% or More and 0.0100% or Less"

B is an element that is segregated in grain boundaries to improve the strength of the grain boundaries and is thus contained as necessary. In a case where B is contained, the B content is preferably set to 0.0005% or more in order to reliably exhibit the above-described effect. The B content is preferably 0.0010% or more. On the other hand, even when more than 0.0100% of B is contained, the above-described effect is saturated, and thus the B content is preferably set to 0.0100% or less. The B content is more preferably 0.0075% or less.

"Ca: 0% or More and 0.0100% or Less"

Ca is an element having an action of deoxidizing molten steel to make steel sound. In order to reliably exhibit this action, the Ca content is preferably set to 0.0005% or more. On the other hand, even when more than 0.0100% of Ca is contained, the above-described effect is saturated, and thus the Ca content is preferably set to 0.0100% or less.

"REM: 0% or More and 0.30% or Less"

REM is an element having an action of deoxidizing molten steel to make steel sound. In order to reliably exhibit this action, the REM content is preferably set to 0.0005% or more. On the other hand, even when more than 0.30% of REM is contained, the above-described effect is saturated, and thus the REM content is preferably set to 0.30% or less.

In the present embodiment, REM refers to a total of 17 elements consisting of Sc, Y, and lanthanoids, and the REM content refers to the total amount of these elements.

The above-described chemical composition of the hot-stamped article may be measured by an ordinary analysis method. For example, the chemical composition may be measured using inductively coupled plasma-atomic emission spectrometry (ICP-AES). C and S may be measured using an infrared absorption method after combustion, and N may be measured using an inert gas melting-thermal conductivity method. The chemical composition is preferably analyzed after the plating layer on the surface is removed by machining.

Next, the metallographic structure of the base steel sheet that configures the steel sheet for hot stamping that is applied to the hot-stamped article according to the present embodiment and the plating layer will be described.

<Steel Sheet for Hot Stamping>

"In Metallographic Structure of Surface Layer Region that is Region from Surface of Base Steel Sheet to Depth of 50 μm, 15.0% or More of Crystal Grains of One or Two Kinds of Unauto-Tempered Martensite and Lower Bainite in Terms of Area Percentage are Included and Average Dislocation Density of Surface Layer Region is $4\times10^{15}$ m/m$^3$ or More"

In the metallographic structure of the surface layer region that is a region from the surface of the base steel sheet to a depth of 50 μm, the proportion of the crystal grains of one or two kinds of unauto-tempered martensite and lower bainite is set to 15.0% or more in terms of area percentage, and the average dislocation density of the surface layer region is set to $4\times10^{15}$ m/m$^3$ or more, whereby it is possible to diffuse Ni in the plating layer into the surface layer region of the steel sheet by heating before hot stamping. The upper limit of the average dislocation density of the surface layer region is not particularly limited and the average dislocation density of the surface layer region may be, for example, $5\times10^{17}$ m/m$^3$ or less or $1\times10^{18}$ m/m$^3$ or less.

When the average heating rate of heating before hot stamping is set to slower than 100° C./s, Ni uniformly diffuses into the entire surface layer region, and it is possible to set the area percentage of residual austenite in the surface layer region of the base steel sheet that configures the hot-stamped article to 8.0% or more. This makes it possible to improve the bendability of the hot-stamped article.

In order to obtain the above-described effect, the proportion of the crystal grains of one or two kinds of unauto-tempered martensite and lower bainite in the surface layer region is set to 15.0% or more in terms of area percentage. The proportion of the crystal grains thereof is preferably 20.0% or more in terms of area percentage. From the viewpoint of suppressing the occurrence of cracking at the time of cold rolling in post processes, the proportion of the crystal grains thereof may be set to 30.0% or more in terms of area percentage. The upper limit of the proportion of the crystal grains of one or two kinds of unauto-tempered martensite and lower bainite in the metallographic structure of the surface layer region is not particularly limited and the proportion of the crystal grains thereof may be, for example, 50% or less or 90% or less in terms of area percentage. In addition, as a remaining structure other than the unauto-tempered martensite and the lower bainite, the metallographic structure in the surface layer region may include one or more of ferrite, upper bainite, residual austenite, and martensite that has been auto-tempered.

The metallographic structure of the central portion of the base steel sheet is not particularly limited, but is normally one or more of ferrite, upper bainite, lower bainite, martensite, residual austenite, an iron carbide, and an alloy carbide. Here, the central portion of the base steel sheet refers to a portion ranging from a position 0.2 mm apart from one surface of the base steel sheet in the sheet thickness central direction to a position 0.2 mm apart from the other surface of the base steel sheet in the sheet thickness central direction.

"Measurement of Area Fraction of Crystal Grains of Unauto-Tempered Martensite and Lower Bainite"

A method for measuring the area fraction of the crystal grains of the unauto-tempered martensite and the lower bainite in the surface layer region of the base steel sheet that configures the steel sheet for hot stamping that is applied to the hot-stamped article according to the present embodiment will be described.

First, a sample is cut out from an arbitrary position 50 mm or more apart from the end face of the steel sheet for hot stamping such that a rolling-direction cross section (sheet thickness section) perpendicular to the surface can be observed. While also depending on a measuring instrument, the size of the sample is set to a size large enough to observe approximately 10 mm in the rolling direction. A measurement surface of the sample that corresponds to the above-described rolling-direction cross section is polished using silicon carbide paper #600 to #1500, and then the measurement surface is mirror-finished using a liquid in which diamond powder having particle diameters of 1 to 6 µm is dispersed in a diluted solution such as alcohol or pure water. Next, the measurement surface is polished for eight minutes at room temperature using colloidal silica containing no alkaline solution to remove strain present on the surface layer of the sample. After that, the measurement surface is sputtered with argon ion beams using a cross section polisher manufactured by JEOL Ltd. At this time, the argon ion beams are radiated to the measurement surface from all directions using a specimen rotary holder manufactured by JEOL Ltd. for the purpose of suppressing the generation of streaky unevenness on the measurement surface.

At an arbitrary position of the measurement surface in the rolling direction, a 50 µm-long region from the interface between the plating layer and the surface of the base steel sheet to a depth of 50 µm is measured by the electron backscatter diffraction method at measurement intervals of 0.1 µm, thereby obtaining crystal orientation information. For the measurement, an instrument including a thermal field emission-type scanning electron microscope (JSM-7001F manufactured by JEOL Ltd.) and an EBSD detector (DVC 5-type detector manufactured by TSL) is used. At this time, the degree of vacuum in the instrument is set to $9.6 \times 10^{-5}$ Pa or less, the accelerating voltage is set to 15 kV, the irradiation current level is set to 13, and the irradiation time of the electron beam is set to 0.5 seconds/point. The obtained crystal orientation information is analyzed using a "Grain Average Image Quality" function provided to software "OIM Analysis (registered trademark)" accompanied by the EBSD analyzer. With this function, it is possible to digitalize the definition of the crystal orientation information as an IQ value and to discriminate a structure that is not auto-tempered. The unauto-tempered martensite and the lower bainite have a poor crystallinity and thus have a small IQ value. A region showing an IQ value calculated to be 60000 or less with the "Grain Average Image Quality" function is defined as the unauto-tempered martensite and the lower bainite, and the area fraction thereof is calculated. The area percentage of the crystal grains of the unauto-tempered martensite and the lower bainite in the surface layer region is obtained by the above-described method.

"Measurement of Average Dislocation Density"

Next, a method for measuring the average dislocation density in the surface layer region will be described. The average dislocation density can be measured by the X-ray diffraction method or transmission electron microscopic observation and is measured using the X-ray diffraction method in the present embodiment.

First, a sample is cut out from an arbitrary position 50 mm or more apart from the end face of the base steel sheet. While also depending on a measuring instrument, the size of the sample is set to a size of approximately 20 mm×20 mm. The thickness of each of the front surface and rear surface of the sample is reduced by 25 µm using a mixed solution of distilled water (48%), a hydrogen peroxide solution (48%), and hydrofluoric acid (4%), thereby reducing the thickness by a total of 50 µm. Therefore, regions 25 µm deep from the surfaces of the sample before the thickness reduction are exposed. X-ray diffraction measurement is carried out on these exposed surfaces to specify a plurality of diffraction peaks of body-centered cubic lattices. The average dislocation density is analyzed from the half widths of these diffraction peaks, thereby obtaining the average dislocation density of the surface layer region. Regarding the analysis method, a modified Williamson-Hall method described in Non-Patent Document 1 is used.

"Plating Layer being Attached to Single Surface in Amount of 10 g/m² or More and 90 g/m² or Less and Having Ni Content of 10 Mass % or More and 25 Mass % or Less with Remainder Including Zn and Impurity"

The steel sheet for hot stamping that is applied to the hot-stamped article according to the present embodiment has a plating layer on the surface of the base steel sheet that configures the steel sheet for hot stamping, the plating layer being attached to a single surface in an amount of 10 g/m² or more and 90 g/m² or less and having a Ni content of 10 mass % or more and 25 mass % or less with a remainder including Zn and impurities. This makes it possible to diffuse Ni into the surface layer region during heating and before hot stamping.

When the amount of the plating layer attached to a single surface is less than 10 g/m² or the Ni content in the plating layer is less than 10 mass %, the amount of Ni that concentrates in the surface layer region of the base steel sheet becomes small, and it is not possible to obtain a desired metallographic structure in the surface layer region after hot stamping. On the other hand, in a case where the amount attached to a single surface exceeds 90 g/m² or the Ni content in the plating layer exceeds 25 mass %, Ni concentrates excessively in the interface between the plating layer and the base steel sheet, the adhesion between the plating layer and the base steel sheet deteriorates, it becomes difficult for Ni in the plating layer to diffuse into the surface layer region of the base steel sheet, and it is not possible to obtain a desired metallographic structure in the hot-stamped article after hot stamping.

The amount of the plating layer attached to a single surface is preferably 30 g/m² or more and more preferably 40 g/m² or more. In addition, the amount of the Ni plating layer attached to a single surface is preferably 80 g/m² or less and more preferably 60 g/m² or less.

The amount of a plate attached in the steel sheet for hot stamping and the Ni content in the plating layer are measured by the following methods.

The amount of the plate attached is measured by collecting a test piece from an arbitrary position in the steel sheet for hot stamping according to the testing method described in JIS H 0401: 2013. Regarding the Ni content in the plating layer, a test piece is collected from an arbitrary position in the steel sheet for hot stamping according to the testing method described in JIS K 0150: 2005, and the Ni content at a ½ position of the total thickness of the plating layer is measured, thereby obtaining the Ni content in the plating layer in the steel sheet for hot stamping.

The sheet thickness of the steel sheet for hot stamping that is applied to the hot-stamped article according to the present embodiment is not particularly limited, but is preferably set to 0.5 to 3.5 mm from the viewpoint of the weight reduction of automotive bodies.

Next, the hot-stamped article according to the present embodiment will be described.

<Hot-Stamped Article>

"Metallographic Structure of Surface Layer Region that is Region from Surface of Base Steel Sheet to Depth of 50 µm Includes 80.0% or More of Martensite and 8.0% or More of Residual Austenite in Terms of Area Percentage"

The metallographic structure of the surface layer region that is a region from the surface of the base steel sheet that configures the hot-stamped article to a depth of 50 µm includes 80.0% or more of martensite and 8.0% or more of residual austenite in terms of area percentage, whereby it is possible to obtain excellent strength and excellent bendability. As a remaining structure other than the martensite and the residual austenite in the surface layer region, one or more of ferrite, upper bainite, and lower bainite may be included.

In a case where the proportion of the martensite is less than 80.0% in terms of area percentage in the metallographic structure of the surface layer region, it is not possible to obtain a desired strength in the hot-stamped article, and it is not possible to apply the hot-stamped article to automotive parts or the like. The proportion of the martensite is preferably 85.0% or more in terms of area percentage. The proportion of the martensite may be set to 92.0% or less in terms of area percentage.

In addition, when the proportion of the residual austenite is less than 8.0% in terms of area percentage, the bendability of the hot-stamped article deteriorates. The proportion of the residual austenite is preferably 10.0% or more in terms of area percentage. There is no need to particularly limit the upper limit; however, in a case where it is attempted to obtain a higher yield strength, the proportion of the residual austenite may be set to 15.0% or less in terms of area percentage.

Next, a method for measuring the metallographic structure of the surface layer region will be described.

First, samples are cut out from an arbitrary position 50 mm or more apart from the end face of the hot-stamped article such that a rolling-direction cross section (sheet thickness cross section) perpendicular to the surface can be observed. While also depending on a measuring instrument, the size of the sample is set to a size large enough to observe approximately 10 mm in the rolling direction. The area fractions of the residual austenite and the martensite are measured using the samples collected by the above-described method.

"Measurement of Area Fraction of Residual Austenite"

A measurement surface of the sample that corresponds to the above-described rolling-direction cross section is polished using silicon carbide paper #600 to #1500, and then the measurement surface is mirror-finished using a liquid in which diamond powder having particle diameters of 1 to 6 µm is dispersed in a diluted solution such as alcohol or pure water. Next, the measurement surface is polished for eight minutes at room temperature using colloidal silica containing no alkaline solution to remove strain present on the surface layer of the sample. At an arbitrary position of the measurement surface of the sample in the rolling direction, a 50 µm-long region from the surface of the base steel sheet to a depth of 50 µm is measured by the electron backscatter diffraction method at measurement intervals of 0.1 µm, thereby obtaining crystal orientation information. For the measurement, an instrument including a thermal field emission-type scanning electron microscope (JSM-7001F manufactured by JEOL Ltd.) and an EBSD detector (DVC 5-type detector manufactured by TSL) is used. At this time, the degree of vacuum in the instrument is set to $9.6 \times 10^{-5}$ Pa or less, the accelerating voltage is set to 15 kV, the irradiation current level is set to 13, and the irradiation time of the electron beam is set to 0.01 seconds/point. The area fraction of the residual austenite is calculated from the obtained crystal orientation information using a "Phase Map" function provided to software "OIM Analysis (registered trademark)" accompanied by the EBSD analyzer, thereby obtaining the area fraction of the residual austenite in the surface layer region. A structure having an fcc structure as the crystal structure is determined to be the residual austenite.

"Measurement of Area Fraction of Martensite"

A measurement surface of the sample (a sample different from the sample used for the measurement of the area fraction of the residual austenite) is polished using silicon carbide paper #600 to #1500, then, the measurement surface is mirror-finished using a liquid in which diamond powder having particle diameters of 1 to 6 µm is dispersed in a diluted solution such as alcohol or pure water, and Nital-etched. Next, a region within 50 µm from the end portion of the observation surface on a side toward the surface of the base steel sheet is observed as an observation visual field using a thermal field emission-type scanning electron microscope (JSM-7001F manufactured by JEOL Ltd.). The area fraction of martensite can be obtained as the total of the area fractions of tempered martensite and fresh martensite. The tempered martensite is an aggregate of lath crystal grains and is differentiated as a structure in which there are two or more extension directions of an iron carbide. The fresh martensite is not sufficiently etched by Nital etching and thus can be differentiated from other structures that are etched. Here, since the residual austenite is also, similar to the fresh martensite, not sufficiently etched, the area percentage of the fresh martensite is obtained from the difference between the area fraction of the structures that are not etched by Nital etching and the area fraction of the residual austenite calculated above. The area fraction of the martensite in the surface layer region is obtained by calculating the total of the area percentages of the tempered martensite and the fresh martensite obtained by the above-described method.

"Concentration of Ni in Surface Layer Region is 8 Mass % or More"

The concentration of Ni in the surface layer region of the base steel sheet that configures the hot-stamped article is 8 mass %. When the concentration of Ni in the surface layer region is set to 8 mass % or more, the residual austenite in the surface layer region is stabilized, and it is possible to increase the amount of the residual austenite in the hot-stamped article. As a result, it is possible to improve the bendability of the hot-stamped article. The concentration of Ni in the surface layer region is preferably 10 mass % or more and more preferably 12 mass % or more. In addition, the upper limit of the concentration of Ni in the surface layer region is not particularly limited, and the concentration of Ni may be, for example, 15 mass % or less or may be 20 mass % or less.

"Method for Measuring Concentration of Ni in Surface Layer Region"

A method for measuring the concentration of Ni in the surface layer region will be described.

First, a sample is cut out from an arbitrary position 50 mm or more apart from the end face of the hot-stamped article. While also depending on a measuring instrument, the size of the sample is set to a size of approximately 20 mm×20 mm. Regarding the measurement of the concentration of Ni, an analysis is carried out in the depth direction along the sheet thickness direction from the surface of the base steel sheet by glow discharge optical emission spectrometry at 10 points on the surface of the sample, the concentrations of Ni at positions 25 μm deep from the surface of the base steel sheet in the sheet thickness direction are obtained, and the average value of the 10 points is calculated. The obtained average value is defined as the concentration of Ni in the surface layer region.

"Plating Layer Having Amount Attached to Single Surface of 10 g/m² or More and 90 g/m² or Less and Having Ni Content of 10 Mass % or More and 25 Mass % or Less with the Remainder Including Zn and Impurity"

The hot-stamped article according to the present embodiment has a plating layer on the surface of the base steel sheet that configures the hot-stamped article, the plating layer having an amount attached to a single surface of 10 g/m² or more and 90 g/m² or less and having a Ni content of 10 mass % or more and 25 mass % or less with a remainder including Zn and impurities.

When the amount of the plating layer attached to a single surface of the base steel sheet is less than 10 g/m² or the Ni content in the plating layer is less than 10 mass %, the amount of Ni that concentrates in the surface layer region of the base steel sheet becomes small, and it is not possible to obtain a desired metallographic structure in the surface layer region after hot stamping. On the other hand, in a case where the amount of the plating layer attached to a single surface of the base steel sheet exceeds 90 g/m² or the Ni content in the plating layer exceeds 25 mass %, Ni concentrates excessively in the interface between the plating layer and the base steel sheet, the adhesion between the plating layer and the base steel sheet deteriorates, it becomes difficult for Ni in the plating layer to diffuse into the surface layer region of the base steel sheet, and it is not possible to obtain a desired metallographic structure in the hot-stamped article.

The amount of the plating layer attached to a single surface of the base steel sheet is preferably 30 g/m² or more and more preferably 40 g/m² or more. In addition, the amount of the Ni plating layer attached to a single surface of the base steel sheet is preferably 80 g/m² or less and more preferably 60 g/m² or less.

The amount of the plate attached in the hot-stamped article and the Ni content in the plating layer are measured by the following methods.

The amount of the plate attached is measured by collecting a test piece from an arbitrary position in the hot-stamped article according to the testing method described in JIS H 0401: 2013. Regarding the Ni content in the plating layer, a test piece is collected from an arbitrary position in the hot-stamped article according to the testing method described in JIS K 0150: 2005, and the Ni content at a ½ position of the total thickness of the plating layer is measured, thereby obtaining the Ni content in the plating layer in the hot-stamped article.

Next, a preferred method for manufacturing the steel sheet for hot stamping that is applied to the hot-stamped article according to the present embodiment will be described.

<Method for Manufacturing Steel Sheet for Hot Stamping>

A steel piece (steel) that is to be subjected to hot rolling may be, for example, a steel piece manufactured by a usual method such as a continuously cast slag or a thin slab caster as long as the steel piece is manufactured by a normal method. Rough rolling may also be carried out by a usual method and is not particularly limited.

"Finishing Rolling"

In the final rolling (final pass) of finishing rolling, it is necessary to carry out the finishing rolling in a temperature range of the $A_3$ point or higher at a rolling reduction of smaller than 20%. When the finishing rolling is carried out at a temperature of lower than the $A_3$ point or the rolling reduction is 20% or larger in the final rolling of the finishing rolling, ferrite is formed in the surface layer region, and it is not possible to set the proportion of the crystal grains of one or two kinds of the unauto-tempered martensite and the lower bainite to 15.0% or more in terms of area percentage. The $A_3$ point is represented by Formula (1).

$$A_3 \text{ point} = 850 + 10 \times (C+N) \times Mn + 350 \times Nb + 250 \times Ti + 40 \times B + 10 \times Cr + 100 \times Mo \quad (1)$$

In Formula (1), C, N, Mn, Nb, Ti, B, Cr, and Mo indicate the amounts (mass %) of the individual elements.

"Cooling"

After the end of the finishing rolling, cooling at an average cooling rate of 80° C./s or faster is initiated within five seconds, and the base steel sheet is cooled to a temperature range of lower than 500° C. and coiled. In addition, even after coiled, the base steel sheet is continuously cooled with water to room temperature. In a case where the cooling initiation time exceeds five seconds, a case where the average cooling rate is slower than 80° C./s, or a case where the coiling initiation temperature is higher than 500° C., ferrite, pearlite, and upper bainite are likely to be formed, and it is impossible to set the proportion of the crystal grains of one or two kinds of the unauto-tempered martensite and the lower bainite to 15.0% or more in terms of area percentage in the surface layer region. The average cooling rate at this time is calculated from a change in the temperature of the surface of the steel sheet and indicates an average cooling rate while the temperature reaches the coiling initiation temperature from the finishing rolling temperature.

"Plating"

On the hot-rolled steel sheet as it is or after cold rolling, a plating layer being attached to a single surface in an amount of 10 g/m² or more and 90 g/m² or less and having a Ni content of 10 mass % or more and 25 mass % or less with a remainder including Zn and impurities is formed to obtain the steel sheet for hot stamping. In a case where cold rolling is carried out before plating, the rolling reduction in the cold rolling is not particularly limited, but is preferably set to 40% to 60% from the viewpoint of the shape stability of the steel sheet. The manufacturing of the steel sheet for hot stamping may additionally include a well-known manufacturing method such as pickling or tempered rolling before the plating. However, when tempering is carried out at a temperature of the Ms point −15° C. or higher, it is not possible to set the proportion of the crystal grains of one or two kinds of the unauto-tempered martensite and the lower bainite to 15.0% or more in terms of area percentage and to set the average dislocation density to $4×10^{15}$ m/m$^3$ or more in the surface layer region, and consequently, it is not possible to obtain a hot-stamped article having a desired metallographic structure. Therefore, in a case where there is a need to carry out tempering before the plating for the reason of a high C content or the like, the tempering is carried out at a temperature of lower than the Ms point −15° C. The Ms point is represented by Formula (2).

$$Ms=493-300×C-33.3×Mn-11.1×Si-22.2×Cr-16.7×Ni-11.1×Mo \quad (2)$$

In Formula (2), C, Mn, Si, Cr, Ni, and Mo indicate the amounts (mass %) of the individual elements.

Next, a method for manufacturing the hot-stamped article according to the present embodiment using the steel sheet for hot stamping manufactured by the above-described method will be described.

<Method for Manufacturing Hot-Stamped Article>

The hot-stamped article is manufactured by heating the steel sheet for hot stamping obtained as described above in a temperature range of 500° C. or higher and the $A_3$ point or lower at an average heating rate of slower than 100° C./s, then, holding the steel sheet for hot stamping at a temperature of the $A_3$ point or higher and the $A_3$ point+150° C. or lower, hot-stamping the steel sheet for hot stamping such that the elapsed time from the initiation of the heating to the initiation of forming reaches a predetermined time or shorter, and cooling the steel sheet for hot stamping to room temperature.

In addition, in order to adjust the strength of the hot-stamped article, a softened region may be formed by tempering a partial region or the entire region of the hot-stamped article at a temperature of lower than the Ms point −15° C.

The steel sheet for hot stamping is heated in a temperature range of 500° C. or higher and the $A_3$ point or lower at an average heating rate of slower than 100° C./s, and the elapsed time from the initiation of the heating to the initiation of the forming is set to 240 to 480 seconds, whereby it is possible to obtain a desired metallographic structure in the surface layer region. This makes it possible to improve the bendability of the hot-stamped article. The average heating rate is preferably slower than 80° C./s. The lower limit of the average heating rate is not particularly limited; however, in actual operation, the average heating rate set to slower than 0.01° C./s causes an increase in the manufacturing costs. Therefore, the average heating rate may be set to 0.01° C./s or faster. The elapsed time from the initiation of the heating to the initiation of the forming is preferably set to 280 seconds or longer and 320 seconds or shorter.

The holding temperature during the hot stamping is preferably set to the $A_3$ point+10° C. or higher. In addition, the holding temperature during the hot stamping is preferably set to the $A_3$ point+150° C. or lower. In addition, the average cooling rate after the hot stamping is preferably set to 10° C./s or faster.

EXAMPLES

Next, examples of the present invention will be described. Conditions in the examples are examples of conditions adopted to confirm the feasibility and effect of the present invention, and the present invention is not limited to these examples of conditions. The present invention is capable of adopting a variety of conditions as long as the objective of the present invention is achieved without departing from the gist of the present invention.

Steel pieces manufactured by casting molten steel having a chemical composition shown in Tables 1 and 2 were hot-rolled, cold-rolled, and plated under conditions shown in Tables 3 and 4, thereby obtaining steel sheets for hot stamping shown in Tables 3 and 4. The obtained steel sheets for hot stamping were hot-stamped by carrying out a heat treatment shown in Tables 5 and 6, thereby obtaining hot-stamped articles shown in Tables 5 and 6. A partial softened region was formed by irradiating a part of the hot-stamped article with a laser, cooling the irradiated portion to lower than the Ms−15° C., and tempering the irradiated portion.

Underlined values in the tables indicate that the values are outside the scope of the present invention, the preferred manufacturing conditions are not satisfied, or property values are not preferable.

TABLE 1

| Steel No. | Chemical composition (mass %) with remainder of Fe and impurities | | | | | | | | | | | | | | $A_3$ (° C.) | Note |
|---|---|---|---|---|---|---|---|---|---|---|---|---|---|---|---|---|
| | C | Si | Mn | P | S | sol•Al | N | Nb | Ti | Mo | Cr | B | Ca | REM | | |
| 1 | 0.16 | 0.250 | 1.10 | 0.006 | 0.0020 | 0.030 | 0.0026 | | | | 0.130 | | | | 865 | Invention steel |
| 2 | 0.44 | 0.250 | 1.80 | 0.010 | 0.0090 | 0.400 | 0.0040 | | | | | | | 0.03 | 858 | Invention steel |
| 3 | 0.23 | 0.250 | 1.20 | 0.010 | 0.0100 | 0.030 | 0.0050 | 0.020 | | 0.200 | | | | | 860 | Invention steel |
| 4 | 0.08 | 0.220 | 0.81 | 0.008 | 0.0009 | 0.044 | 0.0026 | | | | | | | | 851 | Comparative steel |
| 5 | 0.16 | 0.150 | 0.71 | 0.011 | 0.0006 | 0.043 | 0.0037 | | | | | | | | 851 | Invention steel |
| 6 | 0.31 | 0.250 | 0.80 | 0.015 | 0.0011 | 0.041 | 0.0039 | | | | | | | | 853 | Invention steel |
| 7 | 0.36 | 0.180 | 0.81 | 0.005 | 0.0005 | 0.045 | 0.0037 | | | | | | | | 853 | Invention steel |
| 8 | 0.44 | 0.250 | 0.71 | 0.015 | 0.0007 | 0.034 | 0.0042 | | | | | | | | 853 | Invention steel |
| 9 | 0.67 | 0.190 | 0.71 | 0.014 | 0.0003 | 0.037 | 0.0035 | | | | | | | | 855 | Invention steel |
| 10 | 0.78 | 0.250 | 0.90 | 0.014 | 0.0011 | 0.031 | 0.0026 | | | | | | | | 857 | Comparative steel |
| 11 | 0.36 | 0.002 | 0.86 | 0.005 | 0.0003 | 0.041 | 0.0032 | | | | | | | | 853 | Comparative steel |
| 12 | 0.38 | 0.007 | 0.83 | 0.005 | 0.0011 | 0.050 | 0.0030 | | | | | | | | 853 | Invention steel |
| 13 | 0.37 | 0.210 | 0.72 | 0.011 | 0.0007 | 0.030 | 0.0041 | | | | | | | | 853 | Invention steel |
| 14 | 0.37 | 0.240 | 0.90 | 0.015 | 0.0007 | 0.047 | 0.0037 | | | | | | | | 853 | Invention steel |
| 15 | 0.37 | 0.150 | 0.15 | 0.005 | 0.0003 | 0.035 | 0.0030 | | | | | | | | 851 | Comparative + steel |
| 16 | 0.44 | 0.170 | 0.44 | 0.007 | 0.0005 | 0.049 | 0.0029 | | | | | | | | 852 | Invention steel |
| 17 | 0.36 | 0.240 | 0.82 | 0.010 | 0.0011 | 0.035 | 0.0038 | | | | | | | | 853 | Invention steel |
| 18 | 0.37 | 0.180 | 1.29 | 0.007 | 0.0010 | 0.030 | 0.0028 | | | | | | | | 855 | Invention steel |

TABLE 1-continued

| Steel No. | Chemical composition (mass %) with remainder of Fe and impurities | | | | | | | | | | | | | | $A_3$ (° C.) | Note |
|---|---|---|---|---|---|---|---|---|---|---|---|---|---|---|---|---|
| | C | Si | Mn | P | S | sol•Al | N | Nb | Ti | Mo | Cr | B | Ca | REM | | |
| 19 | 0.37 | 0.150 | 1.99 | 0.009 | 0.0005 | 0.035 | 0.0042 | | | | | | | | 857 | Invention steel |
| 20 | 0.38 | 0.170 | 2.89 | 0.007 | 0.0005 | 0.046 | 0.0037 | | | | | | | | 861 | Invention steel |
| 21 | 0.38 | 0.150 | 3.15 | 0.012 | 0.0009 | 0.036 | 0.0042 | | | | | | | | 862 | Comparative steel |
| 22 | 0.38 | 0.240 | 0.82 | 0.0004 | 0.0007 | 0.045 | 0.0026 | | | | | | | | 853 | Invention steel |
| 23 | 0.36 | 0.160 | 0.90 | 0.009 | 0.0006 | 0.030 | 0.0038 | | | | | | | | 853 | Invention steel |
| 24 | 0.36 | 0.150 | 0.77 | 0.094 | 0.0010 | 0.043 | 0.0033 | | | | | | | | 853 | Invention steel |
| 25 | 0.37 | 0.190 | 0.84 | 0.123 | 0.0010 | 0.033 | 0.0032 | | | | | | | | 853 | Comparative steel |
| 26 | 0.36 | 0.200 | 0.75 | 0.009 | 0.0002 | 0.047 | 0.0045 | | | | | | | | 853 | Invention steel |
| 27 | 0.37 | 0.150 | 0.81 | 0.013 | 0.0003 | 0.031 | 0.0029 | | | | | | | | 853 | Invention steel |
| 28 | 0.37 | 0.190 | 0.89 | 0.008 | 0.0022 | 0.044 | 0.0032 | | | | | | | | 853 | Invention steel |
| 29 | 0.36 | 0.230 | 0.80 | 0.007 | 0.0900 | 0.049 | 0.0030 | | | | | | | | 853 | Invention steel |
| 30 | 0.36 | 0.190 | 0.72 | 0.006 | 0.1334 | 0.045 | 0.0025 | | | | | | | | 853 | Comparative steel |

TABLE 2

| Steel No. | Chemical composition (mass %) with remainder of Fe and impurities | | | | | | | | | | | | | | $A_3$ (° C.) | Note |
|---|---|---|---|---|---|---|---|---|---|---|---|---|---|---|---|---|
| | C | Si | Mn | P | S | sol•Al | N | Nb | Ti | Mo | Cr | B | Ca | REM | | |
| 31 | 0.38 | 0.230 | 0.79 | 0.013 | 0.0008 | 0.0001 | 0.0027 | | | | | | | | 853 | Comparative steel |
| 32 | 0.38 | 0.160 | 0.85 | 0.010 | 0.0009 | 0.0003 | 0.0033 | | | | | | | | 853 | Invention steel |
| 33 | 0.35 | 0.200 | 0.72 | 0.014 | 0.0007 | 0.0029 | 0.0042 | | | | | | | | 853 | Invention steel |
| 34 | 0.37 | 0.160 | 0.73 | 0.006 | 0.0006 | 0.031 | 0.0026 | | | | | | | | 853 | Invention steel |
| 35 | 0.35 | 0.240 | 0.83 | 0.009 | 0.0008 | 0.494 | 0.0034 | | | | | | | | 853 | Invention steel |
| 36 | 0.37 | 0.240 | 0.84 | 0.011 | 0.0007 | 0.581 | 0.0040 | | | | | | | | 853 | Comparative steel |
| 37 | 0.37 | 0.220 | 0.89 | 0.007 | 0.0007 | 0.035 | 0.0001 | | | | | | | | 853 | Invention steel |
| 38 | 0.38 | 0.150 | 0.89 | 0.009 | 0.0008 | 0.038 | 0.0073 | | | | | | | | 853 | Invention steel |
| 39 | 0.38 | 0.190 | 0.71 | 0.007 | 0.0007 | 0.039 | 0.0090 | | | | | | | | 853 | Invention steel |
| 40 | 0.36 | 0.210 | 0.73 | 0.008 | 0.0003 | 0.035 | 0.0160 | | | | | | | | 853 | Comparative steel |
| 41 | 0.37 | 0.230 | 0.87 | 0.009 | 0.0006 | 0.031 | 0.0025 | 0.012 | | | | | | | 857 | Invention steel |
| 42 | 0.36 | 0.170 | 0.70 | 0.009 | 0.0009 | 0.046 | 0.0030 | 0.032 | | | | | | | 864 | Invention steel |
| 43 | 0.37 | 0.220 | 0.73 | 0.008 | 0.0004 | 0.033 | 0.0038 | 0.120 | | | | | | | 895 | Invention steel |
| 44 | 0.37 | 0.230 | 0.90 | 0.009 | 0.0011 | 0.044 | 0.0044 | | 0.013 | | | | | | 857 | Invention steel |
| 45 | 0.35 | 0.170 | 0.89 | 0.011 | 0.0007 | 0.043 | 0.0028 | | 0.036 | | | | | | 862 | Invention steel |
| 46 | 0.36 | 0.170 | 0.88 | 0.007 | 0.0004 | 0.031 | 0.0033 | | 0.140 | | | | | | 888 | Invention steel |
| 47 | 0.36 | 0.210 | 0.80 | 0.005 | 0.0003 | 0.037 | 0.0035 | | | 0.006 | | | | | 854 | Invention steel |
| 48 | 0.37 | 0.200 | 0.78 | 0.009 | 0.0010 | 0.031 | 0.0026 | | | 0.012 | | | | | 854 | Invention steel |
| 49 | 0.38 | 0.160 | 0.82 | 0.015 | 0.0009 | 0.031 | 0.0041 | | | 0.980 | | | | | 951 | Invention steel |
| 50 | 0.36 | 0.230 | 0.77 | 0.011 | 0.0008 | 0.043 | 0.0038 | | | | 0.006 | | | | 853 | Invention steel |
| 51 | 0.35 | 0.160 | 0.70 | 0.005 | 0.0006 | 0.047 | 0.0026 | | | | 0.009 | | | | 853 | Invention steel |
| 52 | 0.37 | 0.250 | 0.83 | 0.006 | 0.0010 | 0.033 | 0.0039 | | | | 0.960 | | | | 863 | Invention steel |
| 53 | 0.37 | 0.150 | 0.70 | 0.015 | 0.0008 | 0.031 | 0.0044 | | | | | 0.0006 | | | 853 | Invention steel |
| 54 | 0.36 | 0.230 | 0.86 | 0.005 | 0.0003 | 0.050 | 0.0044 | | | | | 0.0011 | | | 853 | Invention steel |
| 55 | 0.36 | 0.160 | 0.74 | 0.015 | 0.0006 | 0.034 | 0.0044 | | | | | 0.0090 | | | 853 | Invention steel |
| 56 | 0.36 | 0.160 | 0.78 | 0.015 | 0.0006 | 0.037 | 0.0039 | | | | | | 0.0080 | | 853 | Invention steel |
| 57 | 0.36 | 0.190 | 0.80 | 0.010 | 0.0006 | 0.034 | 0.0027 | | | | | | | 0.28 | 853 | Invention steel |
| 58 | 0.14 | 0.110 | 0.84 | 0.011 | 0.0008 | 0.036 | 0.0031 | | | | | | | | 851 | Comparative steel |
| 59 | 0.20 | 0.210 | 1.32 | 0.012 | 0.0007 | 0.028 | 0.0027 | | | | | | | | 853 | Invention steel |

TABLE 3

| | | Finishing rolling | | | | Coiling | Cold rolling | Heat treatment | Steel sheet for hot stamping | | | | | |
|---|---|---|---|---|---|---|---|---|---|---|---|---|---|---|
| Steel sheet No. | Steel No. | Final rolling reduction of finishing rolling (%) | Finishing rolling temperature (° C.) | Cooling | | Coiling initiation temperature (°C) | Rolling reduction (%) | before plating Heating temperature (°C) | Amount of plate attached (g/m²) | Ni content in plating layer (mass %) | Average dislocation density (10¹⁴ m/m³) | Unautomartensite and lower bainite (area %) | Sheet thickness (mm) | Note |
| | | | | Time until initiation of cooling (s) | Cooling rate (° C./s) | | | | | | | | | |
| 1 | 1 | 6 | 910 | 3 | 38 | 571 | 41 | N/A | 39 | 15 | 1 | 4.9 | 1.6 | Comparative steel |
| 2 | 2 | 5 | 921 | 2 | 32 | 596 | 40 | N/A | 55 | 12 | 29 | 2.1 | 1.6 | Comparative steel |
| 3 | 3 | 5 | 934 | 3 | 51 | 397 | 50 | 773 | 41 | 12 | 21 | 6.3 | 1.6 | Comparative steel |

TABLE 3-continued

| | | Finishing rolling | | Cooling | | Coiling | Cold rolling | Heat treatment | Steel sheet for hot stamping | | | | | |
|---|---|---|---|---|---|---|---|---|---|---|---|---|---|---|
| Steel No. | Steel sheet No. | Final rolling reduction of finishing rolling (%) | Finishing rolling temperature (° C.) | Time until initiation of cooling (s) | Cooling rate (° C./s) | Coiling initiation temperature (°C) | Rolling reduction (%) | before plating Heating temperature (°C.) | Amount of plate attached (g/m²) | Ni content in plating layer (mass %) | Average dislocation density (10¹⁴ m/m³) | Unautomartensite and lower bainite (area %) | Sheet thickness (mm) | Note |
| 4 | 4 | 9 | 954 | 1 | 126 | 372 | 53 | N/A | 56 | 15 | 3 | 9.8 | 1.6 | Comparative steel |
| 5 | 5 | 6 | 884 | 4 | 115 | 369 | 58 | N/A | 50 | 17 | 41 | 18.4 | 2.0 | Invention steel |
| 6 | 6 | 8 | 917 | 2 | 133 | 345 | 45 | N/A | 41 | 17 | 96 | 21.2 | 1.9 | Invention steel |
| 7 | 7 | 10 | 901 | 1 | 123 | 330 | 44 | N/A | 54 | 25 | 187 | 21.9 | 1.5 | Invention steel |
| 8 | 8 | 10 | 897 | 4 | 103 | 266 | 49 | N/A | 57 | 16 | 345 | 18.5 | 1.7 | Invention steel |
| 9 | 9 | 6 | 924 | 1 | 115 | 261 | 53 | N/A | 40 | 17 | 948 | 21.3 | 1.6 | Invention steel |
| 10 | 10 | 10 | 898 | 1 | 115 | 316 | 43 | N/A | 53 | 18 | 1120 | 24.7 | 1.3 | Comparative steel |
| 11 | 11 | 8 | 905 | 1 | 142 | 292 | 55 | N/A | 48 | 18 | 155 | 18.1 | 1.3 | Comparative steel |
| 12 | 12 | 5 | 887 | 4 | 118 | 353 | 60 | N/A | 58 | 15 | 230 | 19.9 | 1.6 | Invention steel |
| 13 | 13 | 5 | 926 | 3 | 146 | 390 | 47 | N/A | 48 | 15 | 223 | 22.3 | 1.6 | Invention steel |
| 14 | 14 | 9 | 890 | 3 | 134 | 283 | 55 | N/A | 46 | 15 | 219 | 17.6 | 1.8 | Invention steel |
| 15 | 15 | 8 | 933 | 1 | 123 | 329 | 53 | N/A | 58 | 18 | 11 | 3.7 | 1.6 | Comparative steel |
| 16 | 16 | 6 | 885 | 4 | 115 | 329 | 52 | N/A | 51 | 17 | 372 | 22.0 | 1.3 | Invention steel |
| 17 | 17 | 9 | 900 | 3 | 133 | 379 | 45 | N/A | 43 | 18 | 157 | 22.7 | 1.2 | Invention steel |
| 18 | 18 | 7 | 876 | 4 | 134 | 250 | 42 | N/A | 52 | 17 | 184 | 16.6 | 1.7 | Invention steel |
| 19 | 19 | 10 | 942 | 1 | 105 | 315 | 59 | N/A | 50 | 17 | 229 | 20.3 | 1.9 | Invention steel |
| 20 | 20 | 10 | 960 | 3 | 125 | 273 | 49 | N/A | 45 | 17 | 217 | 22.4 | 2.0 | Invention steel |
| 21 | 21 | 5 | 895 | 2 | 147 | 343 | 41 | N/A | 45 | 17 | 192 | 24.4 | 1.6 | Comparative steel |
| 22 | 22 | 8 | 931 | 3 | 123 | 354 | 43 | N/A | 60 | 17 | 178 | 20.3 | 1.8 | Invention steel |
| 23 | 23 | 10 | 961 | 1 | 138 | 272 | 48 | N/A | 47 | 15 | 159 | 18.4 | 2.0 | Invention steel |
| 24 | 24 | 10 | 955 | 2 | 124 | 330 | 45 | N/A | 60 | 15 | 189 | 18.9 | 1.2 | Invention steel |
| 25 | 25 | 5 | 901 | 1 | 104 | 310 | 50 | N/A | 58 | 15 | 237 | 20.9 | 1.6 | Comparative steel |
| 26 | 26 | 5 | 892 | 4 | 134 | 329 | 52 | N/A | 60 | 16 | 206 | 21.2 | 1.2 | Invention steel |
| 27 | 27 | 10 | 938 | 3 | 104 | 251 | 41 | N/A | 52 | 17 | 164 | 19.2 | 1.5 | Invention steel |
| 28 | 28 | 7 | 953 | 1 | 149 | 372 | 60 | N/A | 50 | 18 | 172 | 23.4 | 1.8 | Invention steel |
| 29 | 29 | 10 | 943 | 1 | 126 | 382 | 41 | N/A | 53 | 17 | 201 | 21.5 | 1.6 | Invention steel |
| 30 | 30 | 7 | 948 | 1 | 148 | 260 | 44 | N/A | 51 | 16 | 237 | 16.9 | 1.2 | Comparative steel |
| 31 | 31 | 5 | 895 | 1 | 115 | 328 | 52 | N/A | 46 | 16 | 152 | 18.5 | 1.8 | Comparative steel |
| 32 | 32 | 6 | 918 | 1 | 126 | 341 | 52 | N/A | 40 | 15 | 214 | 22.4 | 1.2 | Invention steel |
| 33 | 33 | 6 | 885 | 4 | 106 | 314 | 47 | N/A | 43 | 18 | 181 | 18.0 | 1.5 | Invention steel |

TABLE 3-continued

| | | Finishing rolling | | | | Coiling | Cold rolling | Heat treatment | Steel sheet for hot stamping | | | | | |
|---|---|---|---|---|---|---|---|---|---|---|---|---|---|---|
| Steel No. | Steel sheet No. | Final rolling reduction of finishing rolling (%) | Finishing rolling temperature (°C) | Time until initiation of cooling (s) | Cooling rate (°C/s) | Coiling initiation temperature (°C) | Rolling reduction (%) | before plating Heating temperature (°C) | Amount of plate attached (g/m²) | Ni content in plating layer (mass %) | Average dislocation density (10¹⁴ /m³) | Unautomartensite and lower bainite (area %) | Sheet thickness (mm) | Note |
| 34 | 34 | 5 | 883 | 3 | 149 | 266 | 45 | N/A | 46 | 15 | 156 | 19.9 | 1.8 | Invention steel |
| 35 | 35 | 6 | 947 | 1 | 131 | 387 | 57 | N/A | 51 | 15 | 151 | 22.3 | 1.9 | Invention steel |
| 36 | 36 | 8 | 877 | 3 | 109 | 291 | 47 | N/A | 47 | 15 | 206 | 16.1 | 1.6 | Comparative steel |
| 37 | 37 | 9 | 947 | 2 | 118 | 365 | 45 | N/A | 52 | 16 | 171 | 21.4 | 1.7 | Invention steel |
| 38 | 38 | 6 | 924 | 4 | 145 | 393 | 45 | N/A | 46 | 15 | 212 | 23.1 | 1.8 | Invention steel |
| 39 | 39 | 9 | 938 | 3 | 143 | 354 | 51 | N/A | 60 | 16 | 173 | 22.2 | 1.2 | Invention steel |
| 40 | 40 | 5 | 943 | 1 | 144 | 395 | 40 | N/A | 60 | 16 | 220 | 23.7 | 1.8 | Comparative steel |

TABLE 4

| | | Finishing rolling | | | | Coiling | Cold rolling | Heat treatment | Steel sheet for hot stamping | | | | | |
|---|---|---|---|---|---|---|---|---|---|---|---|---|---|---|
| Steel No. | Steel sheet No. | Final rolling reduction of finishing rolling (%) | Finishing rolling temperature (°C) | Time until initiation of cooling (s) | Cooling rate (°C/s) | Coiling initiation temperature (°C) | Rolling reduction (%) | before plating Heating temperature (°C) | Amount of plate attached (g/m²) | Ni content in plating layer (mass %) | Average dislocation density (10¹⁴ /m³) | Unautomartensite and lower bainite (area %) | Sheet thickness (mm) | Note |
| 41 | 41 | 9 | 921 | 2 | 114 | 394 | 58 | N/A | 45 | 16 | 169 | 23.1 | 2.0 | Invention steel |
| 42 | 42 | 9 | 898 | 1 | 106 | 330 | 48 | N/A | 58 | 15 | 229 | 18.9 | 1.8 | Invention steel |
| 43 | 43 | 10 | 952 | 4 | 131 | 376 | 55 | N/A | 59 | 15 | 233 | 23.2 | 1.6 | Invention steel |
| 44 | 44 | 5 | 902 | 4 | 119 | 291 | 52 | N/A | 45 | 16 | 219 | 19.7 | 1.2 | Invention steel |
| 45 | 45 | 6 | 929 | 4 | 131 | 342 | 42 | N/A | 42 | 18 | 223 | 22.4 | 1.5 | Invention steel |
| 46 | 46 | 10 | 929 | 3 | 117 | 316 | 54 | N/A | 58 | 17 | 219 | 21.5 | 2.0 | Invention steel |
| 47 | 47 | 9 | 896 | 4 | 149 | 269 | 55 | N/A | 42 | 17 | 226 | 17.5 | 1.5 | Invention steel |
| 48 | 48 | 10 | 928 | 2 | 110 | 331 | 46 | N/A | 48 | 17 | 223 | 20.5 | 1.8 | Invention steel |
| 49 | 49 | 9 | 987 | 2 | 102 | 386 | 58 | N/A | 58 | 17 | 176 | 23.4 | 1.3 | Invention steel |
| 50 | 50 | 5 | 953 | 2 | 109 | 343 | 43 | N/A | 42 | 17 | 198 | 19.7 | 1.6 | Invention steel |
| 51 | 51 | 9 | 928 | 4 | 101 | 316 | 46 | N/A | 51 | 15 | 216 | 19.2 | 1.6 | Invention steel |
| 52 | 52 | 10 | 939 | 4 | 106 | 338 | 56 | N/A | 60 | 16 | 197 | 21.5 | 1.6 | Invention steel |
| 53 | 53 | 5 | 936 | 4 | 144 | 276 | 57 | N/A | 49 | 17 | 239 | 19.9 | 1.9 | Invention steel |
| 54 | 54 | 10 | 876 | 1 | 104 | 315 | 51 | N/A | 40 | 18 | 211 | 18.3 | 1.4 | Invention steel |
| 55 | 55 | 9 | 944 | 2 | 108 | 338 | 40 | N/A | 54 | 16 | 209 | 21.6 | 1.7 | Invention steel |
| 56 | 56 | 9 | 883 | 3 | 138 | 344 | 50 | N/A | 44 | 15 | 181 | 22.6 | 1.7 | Invention steel |
| 57 | 57 | 9 | 916 | 4 | 127 | 263 | 47 | N/A | 46 | 16 | 166 | 18.9 | 1.5 | Invention steel |

TABLE 4-continued

| | | Finishing rolling | | | | Cold | Heat | Steel sheet for hot stamping | | | | | |
|---|---|---|---|---|---|---|---|---|---|---|---|---|---|
| | | | | Cooling | | Coiling | treatment | | Ni | Average | Unauto- | | |
| Steel No. | Steel sheet No. | Final rolling reduction of finishing rolling (%) | Finishing rolling temperature (°C.) | Time until initiation of cooling (s) | Cooling rate (°C./s) | Coiling initiation temperature (°C.) | rolling Rolling reduction (%) | before plating Heating temperature (°C.) | Amount of plate attached (g/m²) | content in plating layer (mass %) | dislocation density (10¹⁴ m/m³) | martensite and lower bainite (area %) | Sheet thickness (mm) | Note |
| 7 | 58 | 7 | 887 | 7 | 137 | 255 | 40 | N/A | 54 | 25 | 21 | 8.9 | 1.9 | Comparative steel |
| 7 | 59 | 10 | 890 | 4 | 72 | 260 | 47 | N/A | 54 | 25 | 34 | 3.9 | 1.3 | Comparative steel |
| 7 | 60 | 9 | 900 | 2 | 88 | 379 | 54 | N/A | 54 | 25 | 213 | 19.7 | 1.8 | Invention steel |
| 7 | 61 | 6 | 946 | 2 | 176 | 325 | 47 | N/A | 54 | 25 | 216 | 21.3 | 1.4 | Invention steel |
| 7 | 62 | 8 | 963 | 2 | 113 | 536 | 56 | N/A | 54 | 25 | 28 | 1.8 | 1.8 | Comparative steel |
| 7 | 63 | 9 | 905 | 3 | 134 | 308 | 51 | N/A | 54 | 25 | 238 | 25.1 | 1.3 | Invention steel |
| 7 | 64 | 6 | 911 | 3 | 118 | 220 | 59 | N/A | 54 | 25 | 174 | 28.6 | 1.9 | Invention steel |
| 7 | 65 | 5 | 908 | 3 | 139 | 94 | 45 | N/A | 54 | 25 | 204 | 39.4 | 1.4 | Invention steel |
| 7 | 66 | 8 | 881 | 4 | 137 | 42 | 56 | N/A | 54 | 25 | 206 | 46.8 | 1.6 | Invention steel |
| 7 | 67 | 10 | 874 | 2 | 108 | 365 | 43 | 320 | 54 | 25 | 94 | 15.3 | 1.5 | Invention steel |
| 7 | 68 | 6 | 898 | 2 | 119 | 386 | 0 | N/A | 54 | 25 | 203 | 21.5 | 2.8 | Invention steel |
| 7 | 69 | 10 | 901 | 1 | 123 | 330 | 44 | N/A | 54 | 8 | 187 | 21.9 | 1.5 | Comparative steel |
| 7 | 70 | 10 | 901 | 1 | 123 | 330 | 44 | N/A | 54 | 11 | 187 | 21.9 | 1.5 | Invention steel |
| 2 | 71 | 40 | 901 | 5 | 82 | 418 | 51 | N/A | 47 | 15 | 2 | 3.1 | 1.4 | Comparative steel |
| 9 | 72 | 9 | 932 | 2 | 58 | 403 | 53 | N/A | 41 | 16 | 721 | 12.6 | 1.4 | Comparative steel |
| 58 | 73 | 8 | 946 | 3 | 87 | 486 | 49 | N/A | 55 | 14 | 29 | 44.4 | 1.6 | Comparative steel |
| 59 | 74 | 9 | 957 | 3 | 102 | 283 | 50 | N/A | 45 | 17 | 71 | 19.7 | 1.6 | Invention steel |

TABLE 5

| | | | Heat treatment process during hot stamping | | | | | Ni content in plating layer (mass %) | Surface layer region | | | Mechanical properties | | |
|---|---|---|---|---|---|---|---|---|---|---|---|---|---|---|
| Steel No. | Steel sheet No. | Manufacture No. | Heating rate (°C./s) | Holding temperature (°C.) | Elapsed time from initiation of heating to initiation of forming (s) | Tempering temperature (°C.) | Partial softened region | Amount of plate attached (g/m²) | | Concentration of Ni (mass %) | Martensite (area %) | Residual γ (area %) | Tensile strength (MPa) | Bending angle (°) | Note |
| 1 | 1 | A1 | 6 | 901 | 296 | N/A | No | 39 | 15 | 3 | 96.7 | 2.1 | 1503 | 48 | Comparative steel |
| 2 | 2 | A2 | 48 | 889 | 303 | N/A | No | 55 | 12 | 1 | 96.4 | 1.1 | 2403 | 33 | Comparative steel |
| 3 | 3 | A3 | 23 | 906 | 305 | N/A | No | 41 | 12 | 3 | 93.4 | 2.0 | 1618 | 45 | Comparative steel |

TABLE 5-continued

| | | | Heat treatment process during hot stamping | | | | | Ni content in plating layer (mass %) | Surface layer region | | | Mechanical properties | | |
|---|---|---|---|---|---|---|---|---|---|---|---|---|---|---|---|
| | | | Heating rate (°C./s) | Holding temperature (°C.) | Elapsed time from initiation of heating to initiation of forming (s) | Tempering temperature (°C.) | Partial softened region | Amount of plate attached (g/m²) | | Concentration of Ni (mass %) | Martensite (area %) | Residual γ (area %) | Tensile strength (MPa) | Bending angle (°) | |
| Steel No. | Steel sheet No. | Manufacture No. | | | | | | | | | | | | | Note |
| 4 | 4 | A4 | 4 | 903 | 319 | N/A | No | 56 | 15 | 2 | 87.4 | 2.3 | 1001 | — | Comparative steel |
| 5 | 5 | A5 | 1 | 877 | 306 | N/A | No | 50 | 17 | 13 | 85.5 | 12.4 | 1555 | 71 | Invention steel |
| 6 | 6 | A6 | 4 | 909 | 284 | N/A | No | 41 | 17 | 13 | 82.9 | 12.8 | 1867 | 68 | Invention steel |
| 7 | 7 | A7 | 2 | 873 | 287 | N/A | No | 54 | 25 | 18 | 86.5 | 13.2 | 2025 | 59 | Invention steel |
| 8 | 8 | A8 | 13 | 867 | 297 | N/A | No | 57 | 16 | 10 | 89.9 | 9.9 | 2520 | 51 | Invention steel |
| 9 | 9 | A9 | 8 | 896 | 295 | 247 | No | 40 | 17 | 10 | 89.4 | 10.1 | 1716 | 65 | Invention steel |
| 10 | 10 | A10 | 2 | 935 | 302 | N/A | No | 53 | 18 | 11 | 85.3 | 10.8 | 1298 | — | Comparative steel |
| 11 | 11 | A11 | 15 | 894 | 318 | N/A | No | 48 | 18 | 14 | 86.5 | 8.3 | 2208 | 41 | Comparative steel |
| 12 | 12 | A12 | 10 | 946 | 292 | N/A | No | 58 | 15 | 11 | 90.1 | 8.9 | 2022 | 52 | Invention steel |
| 13 | 13 | A13 | 2 | 886 | 284 | N/A | No | 48 | 15 | 11 | 84.9 | 10.3 | 1936 | 61 | Invention steel |
| 14 | 14 | A14 | 12 | 904 | 313 | N/A | No | 46 | 15 | 11 | 86.8 | 10.9 | 2134 | 66 | Invention steel |
| 15 | 15 | A15 | 53 | 862 | 301 | N/A | No | 58 | 18 | 3 | 60.9 | 4.5 | 1361 | — | Comparative steel |
| 16 | 16 | A16 | 68 | 902 | 306 | N/A | No | 51 | 17 | 10 | 87.7 | 9.9 | 2544 | 50 | Invention steel |
| 17 | 17 | A17 | 19 | 949 | 306 | N/A | No | 43 | 18 | 8 | 87.5 | 8.6 | 2008 | 63 | Invention steel |
| 18 | 18 | A18 | 9 | 881 | 307 | N/A | No | 52 | 17 | 9 | 88.3 | 8.6 | 2163 | 57 | Invention steel |
| 19 | 19 | A19 | 74 | 939 | 315 | N/A | No | 50 | 17 | 14 | 82.9 | 13.0 | 2018 | 52 | Invention steel |
| 20 | 20 | A20 | 23 | 911 | 316 | N/A | No | 45 | 17 | 9 | 90.3 | 8.9 | 2101 | 51 | Invention steel |
| 21 | 21 | A21 | 37 | 911 | 306 | N/A | No | 45 | 17 | 15 | 81.7 | 14.9 | 2208 | 46 | Comparative steel |
| 22 | 22 | A22 | 51 | 917 | 313 | N/A | No | 60 | 17 | 15 | 81.5 | 15.3 | 1935 | 65 | Invention steel |
| 23 | 23 | A23 | 33 | 898 | 285 | N/A | No | 47 | 15 | 13 | 84.7 | 13.3 | 2111 | 61 | Invention steel |
| 24 | 24 | A24 | 39 | 888 | 292 | N/A | No | 60 | 15 | 12 | 85.4 | 11.6 | 1967 | 55 | Invention steel |
| 25 | 25 | A25 | 34 | 870 | 305 | N/A | No | 58 | 15 | 9 | 90.6 | 9.1 | 2043 | 42 | Comparative steel |
| 26 | 26 | A26 | 31 | 932 | 310 | N/A | No | 60 | 16 | 13 | 84.3 | 13.3 | 2204 | 64 | Invention steel |
| 27 | 27 | A27 | 72 | 918 | 286 | N/A | No | 52 | 17 | 14 | 85.8 | 13.1 | 2062 | 65 | Invention steel |
| 28 | 28 | A28 | 19 | 940 | 296 | N/A | No | 50 | 18 | 10 | 87.3 | 10.6 | 2069 | 64 | Invention steel |
| 29 | 29 | A29 | 15 | 864 | 284 | N/A | No | 53 | 17 | 15 | 80.6 | 15.3 | 2068 | 58 | Invention steel |
| 30 | 30 | A30 | 30 | 942 | 312 | N/A | No | 51 | 16 | 16 | 82.2 | 15.1 | 2083 | 48 | Comparative steel |
| 31 | 31 | A31 | 33 | 941 | 302 | N/A | No | 46 | 16 | 9 | 86.6 | 9.1 | 2170 | 38 | Comparative steel |
| 32 | 32 | A32 | 42 | 893 | 314 | N/A | No | 40 | 15 | 13. | 84.4 | 13.7 | 1981 | 57 | Invention steel |
| 33 | 33 | A33 | 27 | 915 | 288 | N/A | No | 43 | 18 | 14 | 84.0 | 14.3 | 2053 | 60 | Invention steel |

TABLE 5-continued

| Steel No. | Steel sheet No. | Manufacture No. | Heating rate (°C./s) | Holding temperature (°C.) | Elapsed time from initiation of heating to initiation of forming (s) | Tempering temperature (°C.) | Partial softened region | Amount of plate attached (g/m²) | Ni content in plating layer (mass %) | Concentration of Ni (mass %) | Martensite (area %) | Residual γ (area %) | Tensile strength (MPa) | Bending angle (°) | Note |
|---|---|---|---|---|---|---|---|---|---|---|---|---|---|---|---|
| 34 | 34 | A34 | 17 | 889 | 287 | N/A | No | 46 | 15 | 14 | 81.8 | 13.4 | 2040 | 62 | Invention steel |
| 35 | 35 | A35 | 49 | 881 | 304 | N/A | No | 51 | 15 | 14 | 83.3 | 13.6 | 1985 | 56 | Invention steel |
| 36 | 36 | A36 | 23 | 888 | 282 | N/A | No | 47 | 15 | 16 | 81.9 | 16.4 | 2045 | 46 | Comparative steel |
| 37 | 37 | A37 | 28 | 946 | 305 | N/A | No | 52 | 16 | 9 | 86.6 | 9.2 | 2027 | 61 | Invention steel |
| 38 | 38 | A38 | 13 | 921 | 295 | N/A | No | 46 | 15 | 14 | 82.8 | 13.2 | 2096 | 55 | Invention steel |
| 39 | 39 | A39 | 60 | 915 | 302 | N/A | No | 60 | 16 | 12 | 83.7 | 11.9 | 2007 | 51 | Invention steel |
| 40 | 40 | A40 | 65 | 925 | 305 | N/A | No | 60 | 16 | 13 | 85.0 | 12.7 | 1988 | 45 | Comparative steel |

TABLE 6

| Steel No. | Steel sheet No. | Manufacture No. | Heating rate (°C./s) | Holding temperature (°C.) | Elapsed time from initiation of heating to initiation of forming (s) | Tempering temperature (°C.) | Partial softened region | Amount of plate attached (g/m²) | Ni content in plating layer (mass %) | Concentration of Ni (mass %) | Martensite (area %) | Residual γ (area %) | Tensile strength (MPa) | Bending angle (°) | Note |
|---|---|---|---|---|---|---|---|---|---|---|---|---|---|---|---|
| 41 | 41 | A41 | 40 | 912 | 319 | N/A | No | 45 | 16 | 13 | 84.3 | 12.8 | 2207 | 65 | Invention steel |
| 42 | 42 | A42 | 65 | 877 | 299 | N/A | No | 58 | 15 | 10 | 86.9 | 10.7 | 2171 | 65 | Invention steel |
| 43 | 43 | A43 | 70 | 984 | 302 | N/A | No | 59 | 15 | 10 | 86.8 | 10.1 | 2124 | 63 | Invention steel |
| 44 | 44 | A44 | 76 | 898 | 289 | N/A | No | 45 | 16 | 9 | 89.0 | 8.6 | 2250 | 58 | Invention steel |
| 45 | 45 | A45 | 55 | 944 | 319 | N/A | No | 42 | 18 | 13 | 87.3 | 12.4 | 2044 | 62 | Invention steel |
| 46 | 46 | A46 | 39 | 918 | 307 | N/A | No | 58 | 17 | 15 | 81.6 | 16.0 | 2272 | 61 | Invention steel |
| 47 | 47 | A47 | 57 | 885 | 320 | N/A | No | 42 | 17 | 9 | 91.2 | 8.8 | 2217 | 61 | Invention steel |
| 48 | 48 | A48 | 33 | 867 | 307 | N/A | No | 48 | 17 | 9 | 90.5 | 8.8 | 2225 | 58 | Invention steel |
| 49 | 49 | A49 | 49 | 1005 | 302 | 247 | No | 58 | 17 | 13 | 85.7 | 12.7 | 2265 | 61 | Invention steel |
| 50 | 50 | A50 | 52 | 879 | 285 | N/A | No | 42 | 17 | 13 | 82.2 | 13.1 | 2143 | 64 | Invention steel |
| 51 | 51 | A51 | 47 | 871 | 305 | N/A | No | 51 | 15 | 16 | 81.6 | 15.0 | 2247 | 64 | Invention steel |
| 52 | 52 | A52 | 70 | 903 | 311 | N/A | No | 60 | 16 | 12 | 84.1 | 11.5 | 2088 | 61 | Invention steel |
| 53 | 53 | A53 | 69 | 925 | 299 | N/A | No | 49 | 17 | 9 | 88.8 | 9.4 | 2109 | 60 | Invention steel |
| 54 | 54 | A54 | 59 | 923 | 305 | N/A | No | 40 | 18 | 14 | 83.6 | 13.7 | 1999 | 61 | Invention steel |
| 55 | 55 | A55 | 63 | 898 | 304 | N/A | No | 54 | 16 | 16 | 83.4 | 14.7 | 2045 | 63 | Invention steel |
| 56 | 56 | A56 | 57 | 953 | 307 | N/A | No | 44 | 15 | 9 | 90.4 | 8.5 | 2029 | 64 | Invention steel |
| 57 | 57 | A57 | 61 | 939 | 294 | N/A | No | 46 | 16 | 10 | 88.3 | 10.3 | 2102 | 60 | Invention steel |

TABLE 6-continued

| | | | Heat treatment process during hot stamping | | | | | Ni content in plating layer (mass %) | Surface layer region | | | Mechanical properties | | |
| | | | Heating rate (°C./s) | Holding temperature (°C.) | Elapsed time from initiation of heating to initiation of forming (s) | Tempering temperature (°C.) | Partial softened region | Amount of plate attached (g/m²) | | Concentration of Ni (mass %) | Martensite (area %) | Residual γ (area %) | Tensile strength (MPa) | Bending angle (°) | |
| Steel No. | Steel sheet No. | Manufacture No. | | | | | | | | | | | | | Note |
|---|---|---|---|---|---|---|---|---|---|---|---|---|---|---|---|
| 7 | 58 | A58 | 52 | 933 | 307 | N/A | No | 54 | 25 | 4 | 84.3 | 2.9 | 2132 | 41 | Comparative steel |
| 7 | 59 | A59 | 6 | 878 | 302 | N/A | No | 54 | 25 | 5 | 85.5 | 4.1 | 2112 | 43 | Comparative steel |
| 7 | 60 | A60 | 67 | 890 | 280 | N/A | No | 54 | 25 | 8 | 86.4 | 8.9 | 1989 | 51 | Invention steel |
| 7 | 61 | A61 | 44 | 942 | 320 | N/A | No | 54 | 25 | 18 | 88.0 | 10.1 | 2132 | 71 | Invention steel |
| 7 | 62 | A62 | 75 | 878 | 301 | N/A | No | 54 | 25 | 2 | 84.5 | 3.8 | 2112 | 47 | Comparative steel |
| 7 | 63 | A63 | 7 | 865 | 318 | N/A | No | 54 | 25 | 18 | 84.8 | 15.1 | 1968 | 58 | Invention steel |
| 7 | 64 | A64 | 38 | 887 | 309 | N/A | No | 54 | 25 | 20 | 82.1 | 15.8 | 1989 | 61 | Invention steel |
| 7 | 65 | A65 | 31 | 882 | 299 | N/A | No | 54 | 25 | 22 | 82.9 | 16.1 | 2009 | 69 | Invention steel |
| 7 | 66 | A66 | 5 | 909 | 308 | N/A | No | 54 | 25 | 23 | 84.7 | 15.1 | 2030 | 72 | Invention steel |
| 7 | 67 | A67 | 21 | 917 | 284 | N/A | No | 54 | 25 | 8 | 90.3 | 8.1 | 2132 | 56 | Invention steel |
| 7 | 68 | A68 | 42 | 950 | 290 | N/A | No | 54 | 25 | 13 | 86.7 | 12.1 | 2009 | 58 | Invention steel |
| 7 | 69 | A69 | 75 | 914 | 319 | N/A | No | 54 | 8 | 7 | 90.0 | 7.5 | 1948 | 46 | Comparative steel |
| 7 | 70 | A70 | 70 | 943 | 313 | N/A | No | 54 | 11 | 8 | 88.1 | 8.2 | 2037 | 52 | Invention steel |
| 7 | 7 | A71 | 92 | 937 | 294 | N/A | No | 54 | 25 | 12 | 89.3 | 10.1 | 2018 | 53 | Invention steel |
| 7 | 7 | A72 | 105 | 935 | 306 | N/A | No | 54 | 25 | 4 | 94.7 | 2.8 | 2079 | 48 | Comparative steel |
| 7 | 7 | A73 | 30 | 779 | 314 | N/A | No | 54 | 25 | 5 | 76.4 | 0.8 | 1323 | — | Comparative steel |
| 7 | 7 | A74 | 40 | 1040 | 303 | N/A | No | 54 | 25 | 14 | 82.9 | 14.1 | 2110 | 34 | Comparative steel |
| 7 | 7 | A75 | 87 | 891 | 227 | N/A | No | 54 | 25 | 6 | 90.3 | 6.2 | 2171 | 37 | Comparative steel |
| 7 | 7 | A76 | 26 | 947 | 523 | N/A | No | 54 | 25 | 14 | 66.6 | 1.1 | 1599 | 38 | Comparative steel |
| 7 | 7 | A77 | 10 | 891 | 304 | N/A | Yes | 54 | 25 | 13 | 83.8 | 13.1 | 2129 | 61 | Invention steel |
| 2 | 71 | A78 | 16 | 902 | 300 | N/A | No | 47 | 15 | 1 | 71.1 | 3.3 | 2289 | 48 | Comparative steel |
| 9 | 72 | A79 | 77 | 907 | 289 | N/A | No | 41 | 16 | 6 | 94.1 | 3.8 | 2601 | 29 | Comparative steel |
| 58 | 73 | A80 | 6 | 918 | 280 | N/A | No | 55 | 14 | 8 | 91.7 | 8.1 | 1458 | — | Comparative steel |
| 59 | 74 | A81 | 3 | 922 | 291 | N/A | No | 45 | 17 | 9 | 88.2 | 9.9 | 1521 | 69 | Invention steel |

The metallographic structures, the average dislocation densities, and the concentrations (amounts) of Ni of the steel sheets for hot stamping and the hot-stamped articles were measured by the above-described measurement methods. In addition, the mechanical properties of the hot-stamped articles were evaluated by the following methods.

"Tensile Strength"

Regarding the tensile strength of the hot-stamped article, a No. 5 test piece described in JIS Z 2201: 2011 was produced from an arbitrary position in the hot-stamped article, and the tensile strength was obtained according to the testing method described in JIS Z 2241: 2011. In a case where the tensile strength was lower than 1500 MPa, the tensile strength was evaluated as failure, and a test described below was not carried out.

"Bendability"

The bendability of the hot-stamped article was evaluated by the following method based on the VDA standard (VDA238-100) specified by Verband der Automobilindustrie. In the present examples, displacement under the maximum load that was obtained in a bending test was converted to an angle based on VDA, thereby obtaining the maximum bending angle (°).

Test piece dimensions: 60 mm (rolling direction)×60 mm (direction parallel to sheet width direction) or 30 mm (rolling direction)×60 mm (direction parallel to sheet width direction)

Test piece sheet thickness: 1.0 mm (the front and rear surfaces were polished the same amount, respectively)

Bending ridge: Direction parallel to sheet width direction

Testing method: Supported by rolls and pressed by a punch

Roll diameter: ϕ30 mm

Punch shape: Tip R=0.4 mm

Distance between rolls: 2.0×sheet thickness (mm)+0.5 mm

Pressing rate: 20 mm/min

Tester: SHIMADZU AUTOGRAPH 20 kN

In a case where the maximum bending angle obtained by the above-described method was 50° or more, the bendability was considered to be excellent and determined to be a pass. However, in a case where the maximum bending angle was less than 50°, the bendability was determined to be a failure.

In Tables 5 and 6, in cases where the tensile strength was 1500 MPa or higher and the bendability was pass (50° or more), the strength and the bendability were considered to be excellent, and the steels were determined to be invention steel. In cases where any one of the two performances described above was not satisfied, the steels were determined to be a comparative steel.

From Tables 5 and 6, it is found that hot-stamped articles having a chemical composition, a plate composition, and a metallographic structure within the scope of the present invention have excellent strength and excellent bendability.

On the other hand, it is found that hot-stamped articles having any one or more of a chemical composition and a metallographic structure outside the scope of the present invention are poor in terms of one or more of strength and bendability.

INDUSTRIAL APPLICABILITY

According to the present invention, it is possible to provide a hot-stamped article having excellent strength and excellent bendability.

What is claimed is:

1. A hot-stamped article comprising:
a base steel sheet containing, as chemical components, by mass %,
C: 0.15% or more and less than 0.70%,
Si: 0.005% or more and 0.250% or less,
Mn: 0.30% or more and 3.00% or less,
sol. Al: 0.0002% or more and 0.500% or less,
P: greater than 0% to 0.100%,
S: greater than 0% to 0.1000%,
N: greater than 0% to 0.0100%,
Nb: 0% or more and 0.150% or less,
Ti: 0% or more and 0.150% or less,
Mo: 0% or more and 1.000% or less,
Cr: 0% or more and 1.000% or less,
B: 0% or more and 0.0100% or less,
Ca: 0% or more and 0.0100% or less, and
REM: 0% or more and 0.30% or less
with a remainder including Fe and impurities; and
a plating layer on a surface of the base steel sheet, the plating layer being attached to a single surface in an amount of 10 g/m$^2$ or more and 90 g/m$^2$ or less and having a Ni content of 10 mass % or more and 25 mass % or less with a remainder including Zn and impurities,
wherein a metallographic structure of a surface layer region that is a region from the surface of the base steel sheet to a depth of 50 μm in the base steel sheet includes 80.0% or more of martensite and 8.0% or more of residual austenite in terms of area percentage, and
a concentration of Ni in the surface layer region is 8 mass % or more.

2. The hot-stamped article according to claim 1, wherein the base steel sheet contains, as chemical components, by mass %, one or more selected from the group of
Nb: 0.010% or more and 0.150% or less,
Ti: 0.010% or more and 0.150% or less,
Mo: 0.005% or more and 1.000% or less,
Cr: 0.005% or more and 1.000% or less,
B: 0.0005% or more and 0.0100% or less,
Ca: 0.0005% or more and 0.0100% or less, and
REM: 0.0005% or more and 0.30% or less.

* * * * *